United States Patent [19]

Dieckmann et al.

[11] 4,396,220
[45] Aug. 2, 1983

[54] VEHICLE SEAT

[75] Inventors: Dieter Dieckmann, Sindelfingen; Theodor Reinhard, Böblingen; Ernst Haug, Sindelfingen, all of Fed. Rep. of Germany

[73] Assignee: Daimler-Benz Aktiengesellschaft, Fed. Rep. of Germany

[21] Appl. No.: 274,176

[22] Filed: Jun. 16, 1981

[30] Foreign Application Priority Data

Jun. 20, 1980 [DE] Fed. Rep. of Germany ....... 3023035

[51] Int. Cl.³ .............................................. B60N 1/00
[52] U.S. Cl. ................................... 296/65 A; 297/216
[58] Field of Search .......................... 296/65 A, 65 R; 297/216

[56] References Cited

U.S. PATENT DOCUMENTS 2,900,036 8/1959 Blake ............................... 296/65 A

FOREIGN PATENT DOCUMENTS 2141149 2/1973 Fed. Rep. of Germany ... 296/65 A

Primary Examiner—Robert R. Song
Attorney, Agent, or Firm—Craig & Burns

[57] ABSTRACT

A motor vehicle seat which includes a seat retention device. The seat retention device is constructed such that, in the event of a lateral impact, the seat is permitted to move laterally with respect to a seat runner toward an interior of the vehicle in a direction of action of the lateral impact. Devices are provided which act upon the seat in reaction to the lateral motion thereof.

26 Claims, 5 Drawing Figures

VEHICLE SEAT

The present invention relates to a seat and, more particularly, to a seat for a motor vehicle which includes a seat retention device.

In German Offenlegungsschrift No. 21 41 149, a vehicle seat construction is proposed wherein, in case of a danger occassioned by a frontal or rear impact, the vehicle seat is longitudinally moved to reduce a distance between the front passengers and a dashboard or steering wheel in such a manner so as to at least prevent the bodies of the passengers from sliding against the steering wheel or into the footspace and also to achieve a more advantageous impact position with respect to the passenger stability under load. In this proposed construction, the seat is attached to a fixed vehicle part with a special force limiter being interposed between the seat and vehicle part. The force limiters are adapted to loose their holding function and initiate a definite longitudinal movement of the seat forward or rearward, in dependence upon a direction of the impact, when a predetermined load on the seat in the longitudinal direction of the vehicle is exceeded. In this manner, the passenger safety is enhanced in the event of a frontal or rear impact.

While the above proposed construction provides for a passenger's safety in the event of a frontal or rear impact, such construction does not take into account the effects of laterally directed impacts and forces resulting therefrom which also present a serious problem to the safety of passengers.

The aim underlying the present invention essentially resides in providing a motor vehicle seat which, in the event of a lateral impact, considerably reduces a dynamic passenger load and a biochemical load so that the passengers' safety is significantly increased.

In accordance with advantageous features of the present invention, a motor vehicle seat is provided which includes a seat retention means which, in the event of a lateral impact, permits the seat to move laterally in relation to a seat runner toward an interior of the vehicle in a direction of action of the impact, and means which act upon the seat in reaction to the lateral motion thereof.

By virtue of the above-noted features of the present invention, it is possible that, for instance, in a motor vehicle, in the event of a lateral impact, a seat located near the wall and turned toward the surface to which impact acting thereon is applied, is moved relative to the seat runner in a direction of action of the impact toward a center of the vehicle and in the direction of the opposite wall of the vehicle by the means which are then acting on the seat by virtue of the special construction of the seat retention means.

By virtue of the present invention, an arrangement is provided which enables the passengers to make a relative motion inwardly into the space of the vehicle in case of an instrusion by the impacting device since the whole seat unit is allowed to move laterally. The means acting on the seat in reaction to the lateral motion ensure that the seat does not remain in its original position, for instance, as a result of inertia, following the impact load but rather moves laterally under the effect of the force. In this manner, injury that may result from a lateral impact in an area of the door of the vehicle is prevented thereby providing more survival space to the interior of the vehicle. The overall construction considerably reduces the biochemical load of the passengers and, it goes without saying that it is completely immaterial whether the vehicle seat embodying the present invention is or is not provided with a rail guide for the longitudinal motion of the seat, whether it is fitted as a front or rear seat in a passenger motor vehicle, whether in buses or in other types of vehicles it is installed near a wall or further toward a center of the vehicle.

Advantageously, in accordance with further constructional features of the present invention, the seat retention means has holding and/or guiding means which release and guide the seat when a preassigned pressure load upon the seat is exceeded in reaction to a transverse motion thereof.

In accordance with the present invention, there are provided as means acting on the seat in reaction to the transverse or lateral movement thereof vehicle parts which move and particularly deform, and which act or impinge upon the seat. Particularly simple is the construction of the moving, more particularly, deformable vehicle components such as, for example, in the form of parts of the vehicle door and/or of the center pillar which impinge upon the seat. The vehicle components do not perform their sliding function until a lateral impact occurs, as a result of which the vehicle components move toward an interior of the vehicle and to a seat turned toward or facing the surface to which the impact acting on the seat is applied.

Advantageously, in addition to or in place of the above-noted vehicle components forming parts of the vehicle door and/or center pillar, the vehicle components may take the form of bumper strips or bumpers, etc., which, in motor vehicle protrude laterally from the vehicle body and therefore, in case of a lateral impact, are the first to be acted upon by the forces of impact before the vehicle side is loaded therewith so that deformation is initiated. Thus, a movement of the seat out of a danger zone starts before the vehicle side itself is acted upon.

In accordance with the present invention, at least one special drive means is provided for each seat, with the drive means allowing the seat to move laterally. The at least one lateral displacement of slide drive means associated with each seat impinges upon the seat with a force allowing lateral movement.

Advantageously, at least one sensor means is provided for each seat which reacts to forces that become effective in the event of a lateral impact and as a result of which activates the lateral drive means allowing the seat to slide laterally before the lateral impacts have any effects. By virtue of these features, it is possible to synchronize the lateral motion of the seat with the occurring impact forces so as to optimize the passenger protection whereby a lateral movement of the whole seat unit can be initiated prior to the forces of the impact having their effects.

The holding and guiding means of the present invention may include a lateral slide guide arranged between the seat and at least one runner, with the lateral slide guide being aligned transversely of the longitudinal direction of the vehicle.

Advantageously, the vehicle seat construction of the present invention includes a longitudinal guide with seat-side rail means and vehicle-side guide rail means. Two spaced apart runners extend in a direction of longitudinal movement of the seat, with the seat bearing directly with its seat cushion or indirectly over the guide rail on the spaced apart runners. The vehicle side guide rail is supported on the runners.

The lateral slide guide in each runner or, in kinematic reversal, in the seat cushion, has at least one lateral slot and, on the other part a guide element in, for example, the form of a bolt, engaging in the lateral slot.

The guide element of the present invention may be held in position on the vehicle side guide rail, with the vehicle side guide rail being movable with its rail and the seat retained thereon along the lateral side guide. The guide element in the construction of the present invention is held in position on the seat side rail and engages in the lateral slot in the seat cushion in such a manner that the seat may slide with respect to the guide rail along the lateral slide guide.

The vehicle side guide rail means, in accordance with the present invention, is fastened to a perpendicular web plate of a central tunnel of a floor assembly of the vehicle and/or of a laterally fixed longitudinal beam. The runners of the seat extend laterally from one seat side rail to the other and are fastened thereto. The guide element is held in position on the runner and engages in the lateral slot in the seat cushion or in a seat frame member, or is held in position on the seat cushion and engages in the lateral slot in the runner.

Force limiters are provided in accordance with the present invention which press the contact surfaces of the lateral slide guide against one another with a predetermined joining force and, when a predetermined seat load in the lateral direction of the vehicle is exceeded, the force limiters loose their holding function so as to enable the seat to move laterally.

The force limiters of the present invention may, for example, be bolts or screws which are subject to an adjustable initial stress of a spring and penetrate into a lateral slot and form the guide element with the penetrating portion.

The central tunnel of the floor assembly located in an area of a center of the vehicle is provided with a deformable zone and/or a space providing indentation in a region which is to be impinged by the laterally movable seat.

Accordingly, it is an object of the present invention to provide a vehicle seat which avoids, by simple means, shortcomings and disadvantages encountered in the prior art.

Another object of the present invention resides in providing a motor vehicle seat which reduces the dynamic and biochemical load on a passenger resulting from a lateral directed impact on the vehicle.

A further object of the present invention resides in providing a vehicle seat which is simple in construction and therefore relatively inexpensive to manufacture.

A still further object of the present invention resides in providing a vehicle seat which is laterally displaceable toward an interior of the vehicle upon the occurrence of a lateral impact.

These and other objects, features, and advantages of the present invention will become more apparent from the following description when taken in connection with the accompanying drawings which show, for the purposes of illustration only, several embodiments in accordance with the present invention, and wherein.

Figure 1:
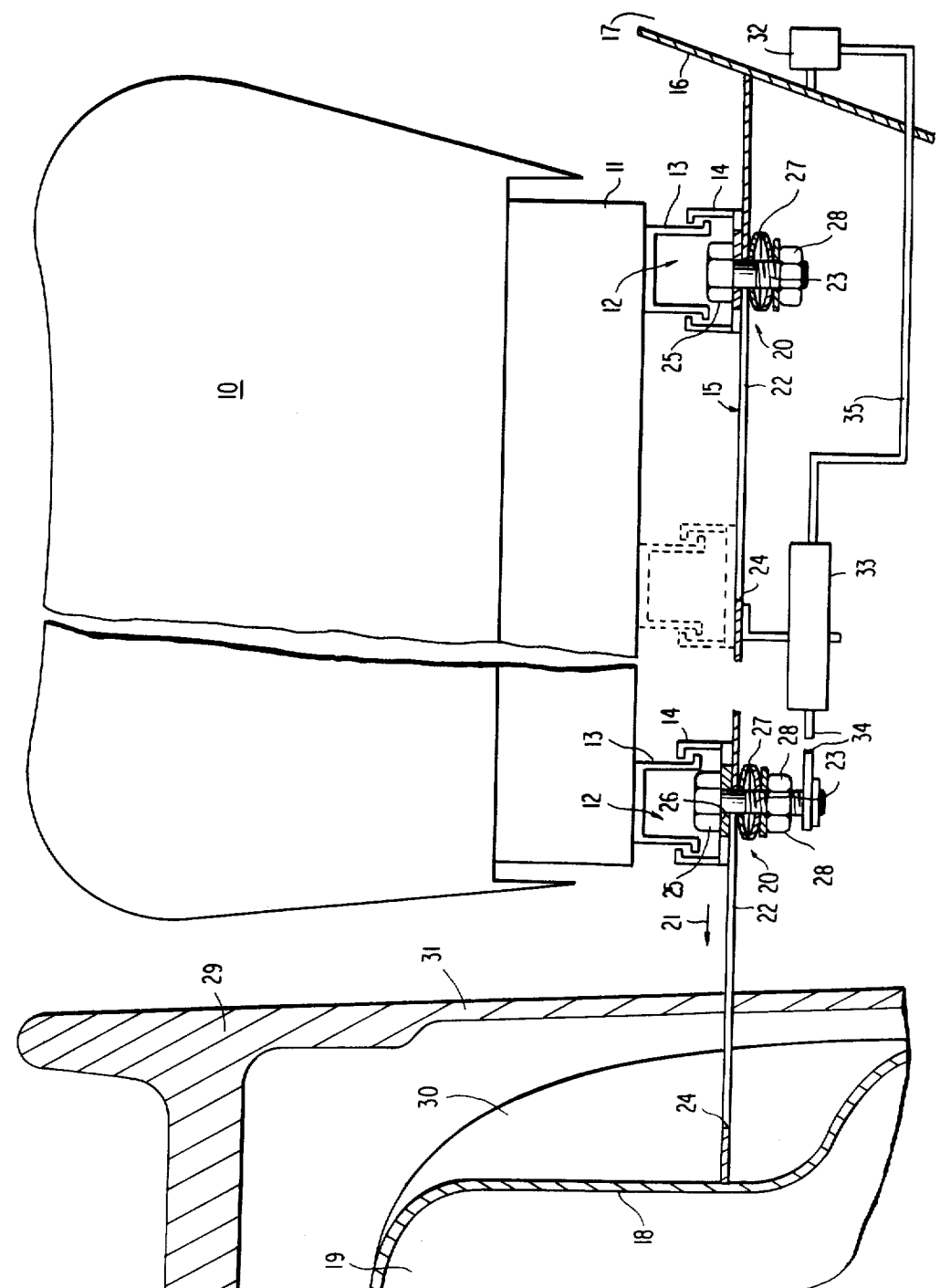
FIG. 1 is a partially schematic vertical cross section of portions of a vehicle seat constructed in accordance with the present invention with a guide rail.

Referring now to the drawings wherein like reference numerals are used throughout the various views to designate like parts and, more particularly, to FIG. 1, according to this figure, a vehicle seat 10 installable, for example, either on a driver or passenger side of a motor vehicle, is provided on both sides with identically constructed rail guides disposed on an underside of a seat cushion 11. Each rail guide 12 includes a rail 13 attached to, for example, a seat cushion 11 of the seat 10, and a guide rail 14 locked or fixed in a longitudinal direction of the vehicle into which the rail 13 engages. In this manner, the seat 10 may be axially moved in the longitudinal direction with the two rails along the two guide rails 14 and be adjustable by way of, for example, a suitable pawl and ratchet or click stop means (not shown) by means of which the seat 10 can then be locked in any desired adjusted position.

The respective rail guides are mounted on stationary members on both sides of the vehicle seat, with the stationary members being formed as runners 15 spaced from each other in a longitudinal direction of the rail guides 12. The runners 15 are attached to a fixed vehicle component such as, for example, to a floor plate (not shown) or, if shown, in FIG. 1, on one side to an essentially perpendicular wall portion 16 of a laterally fixed longitudinal beam 17 and, on the other side, to an essentially perpendicular web plate of a central tunnel construction of a floor assembly 19.

A special guide means generally designated by the reference numeral 20 is interposed between the seat 10 and runner 15 in the area of each of the rail guides 12, with the guide means being adapted to allow the seat 10 to move laterally. A special guide means 20, constructed as a lateral slide guide, is aligned transversely of its associated rail guide and allows the seat 10 to move laterally in the direction of the arrow 21, that is, in a direction toward the cental tunnel of the floor assembly 19 in the event of a lateral impact or as a result thereof either prior to or in the event of a lateral impact and as a result of such lateral impact.

The seat 10 rests on both sides through the rail guides 12 on the runners 15, with the vehicle side guide rails 14 bearing on top of the runners 15. In each runner 15 in an area of each rail guide 12, the lateral slide guide 20 is provided with a lateral slot 22 of a considerable length, with the lateral slot 22 being adapted to accommodate a corresponding guide element in the form of, for example, a bolt 23 which engages in the lateral slots 22.

In the normal lateral position of the seat 10 as shown in FIG. 1, the guide element or bolts 23 abut against right ends of the corresponding lateral slots 22, with an area in which the seat 10 may move laterally being defined to the left of FIG. 1 by the edges 24 of the lateral slots 22.

The guide rails 14 are held in position on the runners 15 by means of special force limiters which press the contact surfaces of the abutting portions of the guide rails 14 and runners 15 against one another with a predetermined joining or contacting force. When a predetermined load in a lateral direction is applied on the seat 10 of the vehicle, the force limiters loose their holding function and enable the seat to move laterally in the direction indicated by the arrow 21 toward the central tunnel of the floor assembly 19. The bolts 23 include a bolt head 25, with the bolts extending or penetrating into the respective lateral slots 22. The bolts 23 serve as the force limiters and are subjected to an adjustable initial stress of a spring. The penetrating portion of the bolt 23 forms the guiding portion of the bolt; therefore, it is unnecessary to provide a special guide element because of the arrangement of the bolts 23. The bolts 23 are inserted into holes 26 and the guide rails 14 are tightened with a predetermined spring tension by means of cup springs 27 and nuts 28. The central tunnel of the floor assembly 19 and a cover 29 are provided, in an area acted upon by the laterally movable seat 10 with a space-providing indentation 30 in an area of the central tunnel of the floor assembly 19 and/or a deformable zone 31 provided in the cover 29. Each seat 10 is also provided with a sensor 32 in an area of the laterally fixed longitudinal beam 17. The sensor 32 is adapted to become effective when a lateral impact occurs. Additionally, each seat 10 is further provided with at least one lateral slide drive 33 which is adapted to act with its drive element 34 on a part of the seat assembly which is movable along the lateral slot 22. The drive 33 is constructed so as to provide for a predetermined force acting upon the seat so as to cause the same to move the seat 10 laterally.

For the sake of simplicity, the drive element 34 is merely schematically illustrated and is placed directly on a free end of the bolt 23; however, as can be readily appreciated, other practical embodiments of a drive element 34 may be provided and may take the form of, for example, a bend which acts at once on the guide rail 14 and this with a smallest possible lever arm, with respect to a direction of force of the lateral slide drive 33. Advantageously, the slide drive 33 may take the form of a pressure-medium-operated cylinder-plunger assembly, a rotary drive, or other suitable translatory drive mechanism which can generate a force for allowing the seat 10 to move laterally in a direction of the arrow 21. The force for moving the seat 10 may be generated by use of an expanding device or through mechanical means. The lateral slide drive 33 is connected through a control line 35 with the sensor 32. The sensor 32 is constructed so as to detect forces, delayed actions, etc. prior to an actual lateral impact and activates the lateral slide drive 33 through the control line 35 in such a manner that the lateral slide drive 33 causes the seat 10 to move laterally in the direction of the arrow 21 prior to the lateral impact having its effects.

Depending upon the circumstances, by virtue of the construction of the present invention, it is not necessary to provide specially constructed force limiters since, through the use of cup springs 27, at least a relatively strong initial stress of the spring is obtained. In case of a lateral movement in a direction of the arrow 21, the seat 10, together with the two rail guides 12 on the other side thereof and the bolts 23 on the laterally directed runners 15 move toward the center of the vehicle in the direction of the arrow 21, with the bolts 23 being guided within their lateral slots 22 and moved to the left in FIG. 1.

If the lateral motion occurs prior to the effects of the lateral impact, the biochemical loads of the passenger on the seat 10 are lightened so that the safety of the passenger is greatly increased. Due to the construction described hereinabove, the dynamic passenger load is reduced and, in case of an intrusion resulting from the impact, the passenger occupying the seat is able to make a relative motion in the space of the vehicle, namely, a lateral motion together with the seat unit toward the interior of the vehicle, with the result being that the lateral impact is avoided and more survival space is provided in the vehicle interior. Moreover, in an area of the central tunnel of the floor assembly 19, by virtue of the provision of the indentation 30 and/or deformable zone 31, an additional zone of deformation is provided in the area of the colliding seat unit which, depending upon the construction, is capable of absorbing energy and which also contributes toward providing a survival space in the central area of the vehicle when the seat 10 moves laterally.

As can readily be appreciated, it is also possible, in a manner not shown, to provide a kinematic reversal of the elements of FIG. 1. More particularly, an arrangement may be made such that the lateral slots 22 are provided in the seat cushion 11 while the guide element formed as a bolt 23 is held in position by the rail guides 12, with the seat 10 being movable relative to the whole rail guide 12 in the lateral direction indicated by the arrow 21.

Figure 2:
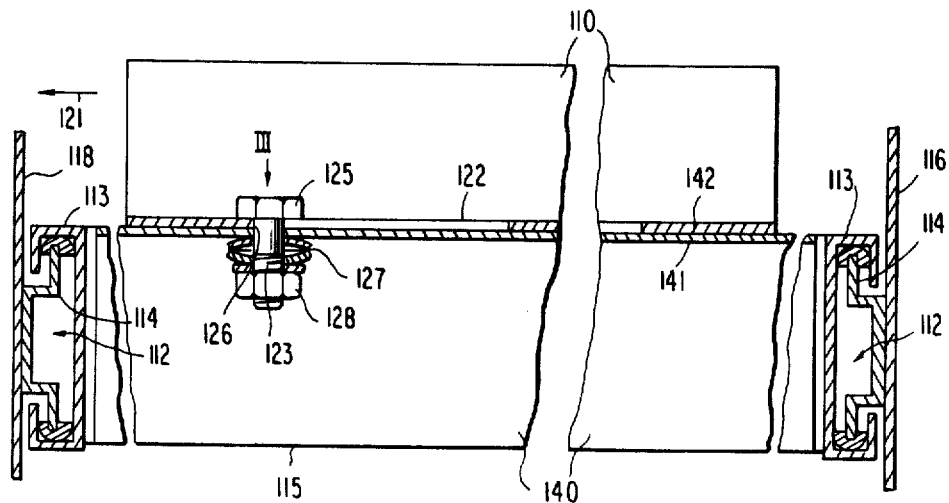
FIG. 2 is a partial cross sectional view of a second construction of a vehicle seat in accordance with the present invention.
Figure 3:
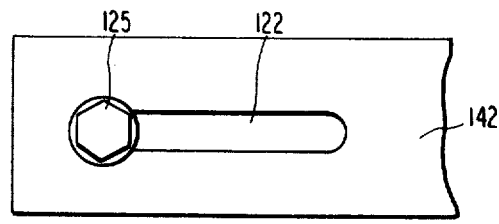
FIG. 3 is a partial top plan view taken in the direction of the arrow III in FIG. 2.

In the construction of FIGS. 2 and 3, wherein reference numerals designating corresponding components of FIG. 1 are augmented by 100, the construction of the rail guides generally designated by the reference numeral 112 differs from that of the construction in FIG. 1. As shown in FIG. 2, the vehicle side guide rail 114 of the left rail guide 112 is fastened to a perpendicular web plate 118 of the floor assembly 119. The rail guide 112 on the right is fastened to an essentially perpendicular wall portion 116 of a laterally fixed longitudinal beam. A cross section of the seat side wall 113 has an essentially C-shaped profile and overlaps the respective guide rails 114. Angle arms 140 or sections with different shapes extend transversely from one seat side rail 113 to the other end and are attached thereto. The angle arms 140 may serve as runners 115 and, for this purpose, for example, two are spaced at a distance from one another in a longitudinal direction of the rail guide 112. The angle arms 140 have an upper horizontal leg 141 on which the seat 110 rests with a lower frame member 142. Guide elements in the form of, for example, bolts 123 are provided, with each bolt 123 having a bolt head 125. In an area of each bolt 123 the frame member 142 or the seat cushion is provided with cup springs and a nut 128 as well as a corresponding lateral slot 122 penetrated by, for example, an unthreaded portion of the bolt 123.

The bolt 125 is retained in a hole 126 provided in the horizontal leg 141 of the angle arm 140 so that, in case of a lateral impact, the bolt 125, together with the angle arm 140, is fixed when the seat moves laterally toward the interior of the vehicle in a direction indicated by the arrow 121.

Figure 4:
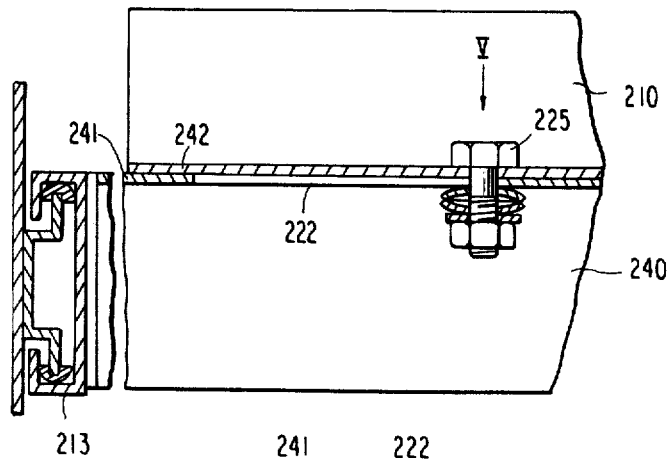
FIG. 4 is a partial cross sectional view of a third embodiment of a seat construction in accordance with the present invention corresponding in principle to that of FIG. 1.
Figure 5:
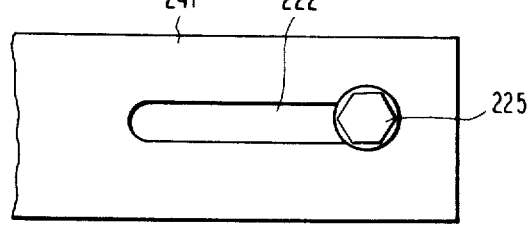
FIG. 5 is a partial top plan view taken in the direction of the arrow V in FIG. 4.

FIGS. 4 and 5 provide an example of another embodiment of a seat construction wherein the elements of the embodiment of FIGS. 2 and 3 are kinematically reversed. As shown in FIGS. 4 and 5, a lateral slot 222 is located in a horizontal leg 241 of the angle arm 240 which is rigidly connected with rails 213 so as to allow longitudinal movement at the respective ends. A bolt 225 is arranged in a bore of the frame member 242 of the seat 210 or of the seat cushion.

It is also possible in a manner not illustrated to provide a seat 10 or 110 which is not fitted with an additional rail guide for the longitudinally movable retention device. Additionally, instead of a laterally slidable guide such as described hereinabove, there may be provided a seat retention device which, in the event of a lateral impact, allows the seat to move laterally with respect to the seat runner toward the vehicle interior in a direction of action of the impact. Such a retention device may, for example, include retaining and/or guiding elements which release and guide the seat when a predetermined pressure load upon the seat in reaction to the lateral motion thereof is exceeded. Suitable varied retention elements may, for example, include holders which are nonyieldable and stable in a longitudinal direction of the vehicle but yield in a lateral direction thereof toward the direction of impact after attaining a definite lateral load such as occurs when there is a lateral impact thereby enabling the seat 10 or 110 to move laterally so that in case of a lateral impact, the seat 10 or 110 which is disposed on a side to which the impact acting thereon is applied, is moved relative to the seat runner in a direction of action of the impact. Furthermore, in contrast to the above-described constructions, other devices may be provided which act upon the seat with respect to lateral movement thereof. More particularly, moving, deforming the vehicle parts such as, parts of the vehicle door and/or central column could be utilized to result in a lateral movement of the seat. As soon as the vehicle parts deform under the effect of a lateral impact, such parts could act upon the seat 10 or 110 with the result of that motion generated by the lateral impact and, more particularly, by the deformation of the vehicle parts, being simultaneously utilized to move the seat 10 or 110 laterally.

As can readily be appreciated, practically any device which is in operative connection with the seat 10 or 110 either right from the start or in the event of a lateral impact, may produce such a pressure load upon the seat in reaction to the lateral motion thereof. Consequently, devices for moving the seat 10 or 110 laterally may take the form of intermediate members interposed between the seat and vehicle parts. In addition thereto or in lieu thereof, it is also possible in a manner not shown to provide special sliding elements which are in operative connection with the seat and, in the event of a lateral impact, are exposed to the forces enabling the seat 10 or 110 to move laterally. Sliding elements of particular interest may, for example, be bumper strips, buffers, or the like which protrude from the lateral side of the vehicle and which because of their projection are the first elements to receive impact impulse from the lateral impact and convert such impulse immediately into a lateral motion of the seat 10 or 110.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A vehicle seat, especially for motor vehicles, comprising retention means connected to the seat and provided for retaining the seat in an adjusted position, the retention means includes lateral impact means for enabling the seat to be displaced laterally upon a lateral impact of the motor vehicle in a direction of action of the impact including lateral slide guide means for sliding the seat during lateral impact, and means acting upon the seat in reaction to the lateral impact for displacing the seat from an original position to a laterally displaced position whereby sliding of the seat occurs during lateral impact of the motor vehicle and begins upon lateral impact.

2. The motor vehicle seat according to claim 1, wherein the lateral impact means for enabling the seat to be displaced laterally includes at least one of holding and guiding elements for releasing and guiding the seat when a predetermined load acting upon the seat is exceeded.

3. The motor vehicle seat according to claim 1, wherein the means for displacing the seat include deformable vehicle parts operatively connected to the seat.

4. The motor vehicle seat according to claim 3, wherein the deformable vehicle part is at least one of a vehicle door and a center pillar of the vehicle.

5. The motor vehicle seat according to one of claims 3 or 4, wherein the deformable vehicle part is a bumper strip means protruding from a side of the vehicle.

6. The motor vehicle seat according to one of claims 1 or 2, wherein the means for displacing the seat includes at least one lateral slide drive means adapted to act upon the seat with a sufficient force to allow lateral displacement thereof.

7. The motor vehicle seat according to claim 6, wherein at least one sensor means is operatively connected with the drive means for sensing a lateral impact and for activating the drive means so as to displace the seat prior to the effects of the lateral impact acting upon the seat.

8. The motor vehicle seat according to claim 7, wherein at least one runner means is provided for supporting the seat, the at least one of holding and guiding means includes at least one slide guide arranged between the seat and the at least one runner means, said at least one slide guide extending transversely to a longitudinal direction of the vehicle.

9. The motor vehicle seat according to claim 8, wherein the retention means further includes a guide rail means extending in the longitudinal direction of the vehicle, the guide rail means includes a first pair of spaced guide rails secured at least indirectly to the seat and a second pair of spaced guide rails cooperable with the respective first pair of guide rails for enabling a longitudinal displacement of the seat.

10. The motor vehicle seat according to claim 9, wherein at least two slide guides are provided, each of the slide guides includes at least one transversely extending slot means arranged in the runner means, and a guide means connected to the seat and engageable in the slot means.

11. The motor vehicle seat according to claim 10, wherein each guide means includes a bolt having a portion thereof accommodated in the respective slot means.

12. The motor vehicle seat according to claim 10, wherein each guide means is respectively connected to the second pair of spaced guide rails for holding the guide means in position, and the first and second pair of guide rails are movable with the guide means along the respective slot means upon the predetermined lateral impact.

13. A motor vehicle seat according to one claims 9 or 10, characterized in that the vehicle includes a floor assembly having a central tunnel and at least one longitudinal beam secured at respective lateral side of the vehicle, the central tunnel includes a perpendicularly extending web plate, said second pair of guide rails are respectively connected to the web plate and the longitudinal beam, and in that the first pair of guide rails are arranged on respective ends of the runner means.

14. The motor vehicle according to claim 13, wherein the force limiting means are interposed between the respective guide means and the sliding guides for urging the respective guide means against the sliding guides with a predetermined force such that, upon a predetermined load on the seat in a lateral direction, the force of the force limiting means is exceeded and the seat is displaced laterally.

15. The motor vehicle seat according to claim 14, wherein the force limiting means includes spring means cooperable with each of the guide means, each of the guide means include bolt means extending into the respective slot means, and the bolt means are adjustable so as to set an initial force of the spring means.

16. The motor vehicle seat according to claim 15, wherein means are provided in an area of the central tunnel for accommodating the laterally displaced seat.

17. The motor vehicle seat according to claim 16, wherein the accommodating means includes at least one of an indentation provided in the central tunnel and a deformation means mounted at the central tunnel.

18. The motor vehicle seat according to claim 7, wherein at least one runner means is provided for supporting the seat, the at least one of holding and guiding means includes at least two slide guides arranged between the seat and the at least one runner means, said slide guides extending transversely to a longitudinal direction of the vehicle.

19. The motor vehicle seat according to claim 18, wherein the retention means further includes a guide rail means extending in the longitudinal direction of the vehicle, the guide rail means includes a first pair of spaced guide rails secured at least indirectly to the seat and a second pair of spaced guide rails cooperable with the respective first pair of guide rails for enabling a longitudinal displacement of the seat.

20. The motor vehicle seat according to claim 19, wherein in the at least two slide guides include at least two transversely extending slot means arranged in the seat means, and guide means connected to the seat means and engageable in the slot means.

21. The motor vehicle seat according to claim 20, wherein each of the guide means is respectively connected to the first pair of spaced guide rails for holding the guide means in position, and the seat and guide means are movable along the respective slot means upon a predetermined lateral impact.

22. The motor vehicle seat according to claim 21, wherein the vehicle includes a floor assembly having a central tunnel and at least one longitudinal beam secured at respective lateral sides of the vehicle, the central tunnel includes a perpendicularly extending web plate, said second pair of guide rails are respectively connected to the web plate and the longitudinal beam, and the first pair of guide rails are arranged on respective ends of the runner means.

23. The motor vehicle seat according to claim 22, wherein that the force limiting means are interposed between the respective guide means and the sliding guides for urging the respective guide means against the sliding guides with a predetermined force such that, upon a predetermined load on the seat in a lateral direction, the force of the force limiting means is exceeded and the seat is displaced laterally.

24. The motor vehicle seat according to claim 23, wherein the force limiting means includes spring means cooperable with each of the guide means, each of the guide means include bolt means extending into the respective slot means, and the bolt means are adjustable so as to set an initial force of the spring means.

25. The motor vehicle seat according to one of claims 1, 2, 3, 6, 7, or 24, wherein means are provided in an area of the central tunnel for accommodating the laterally displaced seat.

26. The motor vehicle seat according to claim 25, wherein the accommodating means includes at least one of an indentation provided in the central tunnel and a deformation means mounted at the central tunnel.

* * * * *